Patented July 31, 1923.

1,463,781

UNITED STATES PATENT OFFICE.

AUGUSTUS WARREN GOULD, OF MOUNT ANGEL, OREGON; HAZEL PHELAN EXECUTRIX OF SAID A. WARREN GOULD, DECEASED.

FILLER AND ACCELERATOR FOR RUBBER COMPOUNDS.

No Drawing.    Application filed June 6, 1921.   Serial No. 475,528.

*To all whom it may concern:*

Be it known that I, AUGUSTUS WARREN GOULD, a citizen of the United States of America, and resident of the town of Mount Angel, in the county of Marion and State of Oregon, have invented certain new and useful Improvements in Fillers and Accelerators for Rubber Compounds, of which the following is a specification.

My invention consists of a product intended for use as a filler and accelerator in the manufacture of rubber products. It consists of a powder made from a tuffaceous breccia which has been calcined.

I have found that a tuffaceous breccia when calcined and then ground to a powder has superior qualities as a filler and accelerator for use in making rubber compounds and particularly rubber which is subjected to wear and in which a clinging or frictional grip is desired, as for instance, in making vehicle tires, or in which a velvety "feel" in the finished article is sought, as, for example, in the manufacture of certain rubber toilet articles, rubber toys, etc.

The material from which I have so far made my product is a tuffaceous breccia which is found in the vicinity of Mount Angel, Oregon, although deposits of the proper character from any source may be used.

In preparing the product the material is first crushed, calcined and then ground to a powder of whatever degree of fineness may be required for the particular product or grade of product desired.

Calcination eliminates from the product all vegetable and volatile products and converts it into a product which will unite with rubber to form a homogeneous product. A high percentage of this calcined tuffaceous breccia may be employed as a filler, said filler also having a highly efficient action as an accelerator, causing a rapid curing action of the rubber in which it is incorporated.

Rubber in which this product has been incorporated, has superior toughness and a high coefficient of friction. It has a clinging velvety feel and action which in tire treads give them a non-slipping character superior to that of the average tire and in toilet articles, toys etc., renders them pleasing to the touch.

I also find from experiments that a higher percentage of this product may be incorporated in the rubber than is possible with other products used for like purposes and yet obtain a product which is elastic and tough. The employment of this high percentage of the improved filler produces a rubber article which will not so readily deteriorate or rot under the action of forces or substances which are ordinarily detrimental to rubber products.

The manner of handling it in making rubber products is essentially the same as that now employed in incorporating other fillers and accelerators in such products.

The product has a specific gravity of approximately 2.25. Its electrical and heat conductivity is low and it is not injuriously affected by temperatures which are quite harmful to the usual rubber compounds. The raw product, having been calcined, is capable of resisting any temperature which the associated products are able to sustain.

The source of the raw material and the process of grinding and classifying the product is immaterial.

What I claim as my invention is:

A composition consisting of rubber and a filler consisting of calcined tuffaceous breccia which has been ground to a powder.

Signed at Mount Angel, Marion County, Oregon, this 27th day of May, 1921.

AUGUSTUS WARREN GOULD.